Feb. 21, 1939. M. B. SCHARFELD 2,147,802
EYEGLASS PAD
Filed Sept. 27, 1937
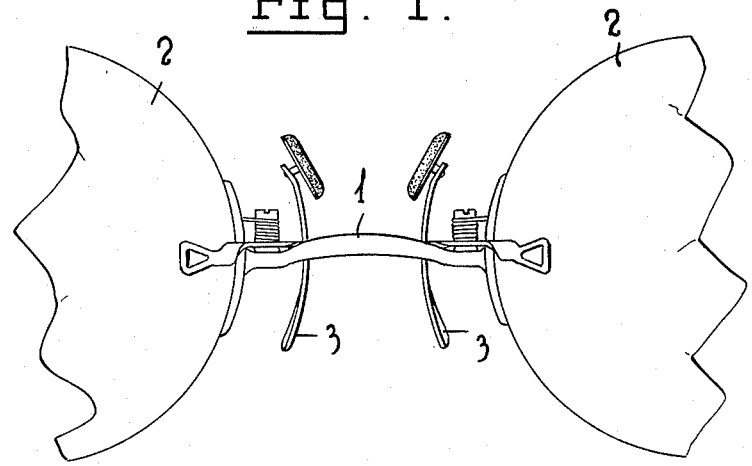
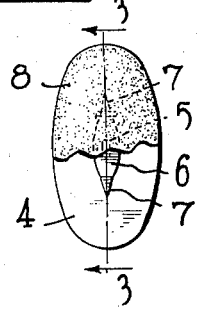  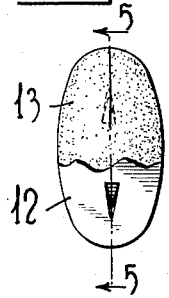 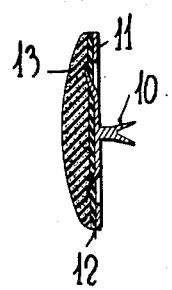
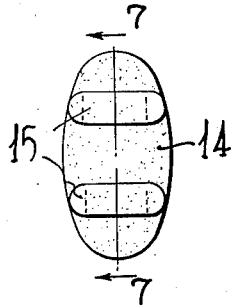 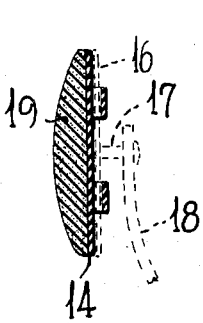
Inventor
Maurice B. Scharfeld
By Dyre & Kirchner
Attorneys Patented Feb. 21, 1939

2,147,802

UNITED STATES PATENT OFFICE 2,147,802

EYEGLASS PAD

Maurice B. Scharfeld, Cleveland, Ohio

Application September 27, 1937, Serial No. 165,952

1 Claim. (Cl. 88—48)

My invention relates to nose pads for eyeglasses.

Considerable discomfort is experienced by the wearers of eyeglasses because, as generally made and worn, the eyeglass frame is provided with metallic, mother of pearl or other hard, rigid elements which engage the nose of the wearer to support the eyeglass frame on the face. The elements which engage the wearer's nose commonly exert pressure on the bridge of the nose. This pressure is in some cases equal only to the weight of the eyeglass structure, but in some cases is increased by a spring-pressed clamping force, particularly in spectacles of the pince-nez type. In any case continued wearing of the spectacles is apt to produce permanent disfigurement in the form of depressions at the side of the bridge of the nose.

The invention contemplates the provision of resilient pad means for the elements of the eyeglass frame which are worn in contact with the nose. This pad means may take the form of jackets for the contact elements of the eyeglass frame, or replacement contact elements having more or less permanently attached padded members may be substituted for the original metal or mother of pearl contact pieces of the conventional eyeglass frame.

Efforts have been made heretofore to provide pads for this purpose. Rubber appears to have been the preferred material, but in all instances with which I am acquainted these prior art efforts have not been wholly successful because of the difficulty of permanently bonding these rubber elements, which are necessarily of small size, to the supporting part of the eyeglass frame and yet making them sufficiently soft and resilient to accomplish the desired padding function.

The present invention proposes a novel type of pad which consists of two rubber parts of different characteristics. The surface rubber, which engages the face or skin of the wearer, is comparatively soft and resilient and its contact surface is characterized by a multiplicity of irregularities so that secure gripping contact with the skin of the wearer is assured. Associated with this surface rubber is a backing layer or ply of relatively denser, firmer or harder rubber, and this backing ply is securely engaged with an appropriate part of the metal or other hard, rigid portion of the eyeglass frame. The bond between the two kinds of rubber is tenacious and permanent, and the connection between the eyeglass frame and the backing rubber is equally good and permanent. In this way the construction is rendered durable and long lasting without impairing the softness and resilience of the pad surfaces which engage the skin of the wearer.

The accompanying drawing illustrates the invention in certain preferred forms of embodiment, but these embodiments are by way of exemplification and not limitation, it being recognized that the invention may be incorporated in other and differently modified forms, all within its scope and spirit as defined by the appended claim.

In the drawing, which is made on a relatively enlarged scale,

Figure 1 is a fragmentary front elevational view of a conventional pair of eyeglasses showing an embodiment of the invention;

Fig. 2 is a front plan view, partly broken away, of a pad and its backing plate;

Fig. 3 is a longitudinal cross-sectional view taken on the line 3—3 of Fig. 2;

Fig. 4 is a front elevational view, partly broken away, of a modified form of the invention;

Fig. 5 is a longitudinal cross-sectional view taken on the line 5—5 of Fig. 4;

Fig. 6 is a rear elevational view of a further modified embodiment of the invention;

Fig. 7 is a longitudinal cross-sectional view taken on the line 7—7 of Fig. 6; and Fig. 8 is a longitudinal cross-sectional view of a still further embodiment of the invention.

In Fig. 1 the reference numeral 1 designates generally an eyeglass frame of conventional type, mounting the lenses 2, 2 and including arms or their equivalent 3, 3, each of which carries at one end some form of contact piece for engaging the nose or other part of the face of the wearer. It is of course a fact that the style and construction of the frame members vary widely, and the type shown in Fig. 1 is intended to be conventional and representative of all types. It is customary for the contact pieces to be made of metal, mother of pearl or the like and to be pivotally or otherwise movably mounted on the arms 3.

A usual type of connection for the contact pieces and the arms comprises a post projecting from the rear of the contact pieces and loosely mounted in the ends of the arms so that the contact pieces are capable of slight rocking movement with relation to the arms and thus may conform to the shape of the bridge of the wearer's nose, or other part of the face, so as to permit the contact pieces to lie flat against the skin and thus distribute the pressure of their contact over substantially all of their surface.

As has been explained, the invention contemplates providing pad means for these contact pieces, so that the pressure of contact will be uniformly distributed over the whole surface of the pad regardless of individual irregularities or other peculiarities in the shape of the wearer's nose. To this end I provide a pad of rubber for the contact end of each arm 3. The invention is concerned particularly with the construction of these rubber pads and with means for associating them with the arms 3 or other supporting parts of the eyeglass frame. In Figs. 2 and 3 I have illustrated an embodiment of the invention in the form of replacement contact elements which may be substituted for the usual metal or mother of pearl elements. The new elements consist of a metallic backing plate 4 which may conveniently be made of elongated oval or elliptical shape as viewed in plan, and comparatively thin as viewed in side elevation, as will clearly appear from a comparison of Figs. 2 and 3. This plate is apertured centrally to receive a post 5 which may be bifurcated or split at its rear end and which carries a relatively enlarged head 6 at its forward end. The head 6 lies in contact with the front face of the plate 4, and the prongs are passed through an opening in the end of an arm 3 and then spread apart to secure the post and the plate 4 to the arm 3 in the manner of the action of a split rivet. Obviously any other mode of connecting the plate 4 to the arm 3 may be employed. The illustrated connection is rather to be preferred because of its simplicity and low cost and because it can be made to provide the desired oscillatory mounting of the plate 4 on the arm 3.

The ends of the head 6 are preferably pronged as shown at 7 to penetrate the pad contemplated by the invention and secure it to the plate 4. This pad, in the form shown in Figs. 2 and 3, comprises a contact member 8 of relatively open cellular rubber having a soft and easily compressible body and preferably characterized by surface irregularities adapted to make secure gripping contact with the skin of the wearer. At the rear face of the body 8 is a layer or ply 9 of relatively harder, denser and stronger rubber. The two rubbers are securely bonded together by any well known means, as for example vulcanization or cementing. The ply 9 contains two small openings through which the prongs 7 are inserted, and these prongs are directed slightly forwardly out of the plane of the rest of head 6, so as conveniently to be made to enter the openings in the ply 9. The connection between the plate 4 and the rubber pad is therefore effected by the overlapping of the prongs 7 and the ply 9, and inasmuch as the prongs are of metal and the ply 9 is of strong rubber, the connection is exceedingly secure and permanent, being far superior to any kind of connection which might be made directly between the head 6 and the soft, open cellular rubber of the pad body 8.

As shown in the drawing, the soft contact member 8 is preferably made thickest in its central zone, where the pressure on the nose of the wearer is more or less concentrated. In use the surface of this thickened central zone is compressed substantially to the plane of the surface of the thinner end zones of the member 8.

It is not necessary to cement or otherwise secure the extreme end portions of the ply 9 to the metallic backing plate 4, because the comparative stiffness of the ply 9 holds the whole ply, including its extreme end portions, flat against the plate 4.

In Figs. 4 and 5 I show a slightly different embodiment of the invention, in which the post 10 is integral with the backing plate 11 and the backing plate has two prongs struck out from its front surface, one near each of its ends. These prongs penetrate a rubber ply 12, like the ply 9, and make similar strong connection therewith. The rubber body 13 of Figs. 4 and 5 may be similar in every way to the body 8 of Figs. 2 and 3.

In Figs. 6 and 7 I show a ply 14 of relatively strong, dense rubber, like the elements 9 and 12 heretofore described, and integral with, or securely bonded to, the rear surface of the ply 14 is a pair of spaced straps 15, preferably made of the same kind of material as the ply 14. These straps may be slipped over the end portions of the usual metal or mother of pearl contact piece 16 which is carried by the post 17 mounted on the arm 18 of a conventional eyeglass frame. In this embodiment of the invention the pad also consists of a body 19 of the same type of rubber as that used for the bodies 8 and 13 hereinbefore described, and the connection between the body 19 and the ply 14 is like that described for the analogous parts of the previously described embodiments.

Fig. 8 shows a post 20 having a head 21 provided with end prongs which penetrate spaced openings in a metal backing plate 22, and enter the rubber pad elements, consisting of a dense ply 23 and a soft body 24.

The contact body 8, 13, 19 or 24 may be made of rubber of the kind known as sponge rubber. The ply 9, 12, 14 or 23 may be made of any suitably strong and relatively dense rubber. This element may be made separately and bonded in any secure manner to the sponge rubber element, or it may consist of the skin naturally formed on the surface of sponge rubber during its manufacture.

It will be understood that in each case where I have shown the post and its head integral the construction may be altered, if desired, by forming these elements separately and securing them together by a screw, by solder, by a friction fit, or in any other way.

It will be appreciated from the foregoing that the surface irregularities of the contact rubber cause it to make secure gripping contact with the skin of the wearer, that the resilience of the contact rubber body comfortably cushions the pressure of the eyeglass frame on the skin of the wearer, and that the novel formation of the rubber body makes a secure and permanent connection between the pad and its mounting.

I claim:

A pad for eyeglasses comprising a rubber body having one side portion comprised of sponge rubber characterized by a multiplicity of surface irregularities adapted to make secure gripping contact with the skin of the wearer and having its opposite side portion characterized by a portion of denser and stronger rubber adapted to be engaged securely with an element carried by the eyeglass frame, said sponge rubber portion being soft and easily compressible so as to cushion the pressure of the eyeglass frame on the skin of the wearer and being of substantial thickness, and a plurality of oppositely directed prongs secured to and projecting from the eyeglass frame at an inclination to the plane of the pad, penetrating and mounting said portion of denser and stronger rubber and contained and concealed within said sponge rubber portion.

MAURICE B. SCHARFELD.